(12) United States Patent
Leekley et al.

(10) Patent No.: US 11,544,729 B2
(45) Date of Patent: Jan. 3, 2023

(54) BLOCKCHAIN-ENABLED CRYPTO ASSET COMPLIANCE SYSTEM FOR TRACKING ASSET ALLOCATION

(71) Applicant: Vertigo Studios, LLC, Charlotte, NC (US)

(72) Inventors: Gregory H. Leekley, Charlotte, NC (US); Alexander Savenok, Grandview, MO (US); Pavel Savenok, Wheaton, IL (US)

(73) Assignee: Inspired Patents, LLC, Wheaton, IL (US)

( * ) Notice: Subject to any disclaimer, the term of this patent is extended or adjusted under 35 U.S.C. 154(b) by 0 days.

(21) Appl. No.: 17/306,675

(22) Filed: May 3, 2021

(65) Prior Publication Data

US 2021/0256550 A1    Aug. 19, 2021

Related U.S. Application Data

(62) Division of application No. 16/134,075, filed on Sep. 18, 2018, now Pat. No. 10,997,620.

(Continued)

(51) Int. Cl.
*G06Q 30/00* (2012.01)
*G06Q 30/02* (2012.01)
(Continued)

(52) U.S. Cl.
CPC ....... *G06Q 30/0215* (2013.01); *G06Q 20/065* (2013.01); *G06Q 20/123* (2013.01);
(Continued)

(58) Field of Classification Search
CPC ............ G06Q 30/0215; G06Q 20/065; G06Q 20/123; G06Q 20/3224; G06Q 30/0214;
(Continued)

(56) References Cited

U.S. PATENT DOCUMENTS 8,667,075 B1 * 3/2014 King .................. H04N 21/4788
709/206
8,769,031 B1 * 7/2014 Lee ....................... H04L 65/403
709/206

(Continued)

*Primary Examiner* — Matthew T Sittner
(74) *Attorney, Agent, or Firm* — Christopher J. Scott (57) ABSTRACT

Blockchain-enabled crypto asset systems allow a user to control how advertisers access the user's personal data; allow crypto asset compensation in exchange for social amplification; and track asset allocation. Asset allocation tracking is made the focus of these specifications. Payments made via blockchain tracking, and the distribution of any revenues derived from cost savings provided to terrestrial, satellite or digital radio broadcasters back to music rights holders and other related groups are provided. These rights holders typically like to incentivize consumers, and by using the crypto assets or tokens created by the present invention, a reward for listening/consuming may be provided. Further, payments for industry services to the rights holder are contemplated to include, but not be limited to any Performance Rights Organizations (PROs), Record Labels, Publishing Companies—Administrators, Managers, Agents or any fractional rights holders or owners who would hold claim against any such revenues.

19 Claims, 4 Drawing Sheets

Related U.S. Application Data (60) Provisional application No. 62/560,074, filed on Sep. 18, 2017.

(51) Int. Cl.
*G06Q 20/06* (2012.01)
*G06Q 20/12* (2012.01)
*G06Q 20/32* (2012.01)

(52) U.S. Cl.
CPC ..... *G06Q 20/3224* (2013.01); *G06Q 30/0214* (2013.01); *G06Q 30/0269* (2013.01); *G06Q 2220/00* (2013.01)

(58) Field of Classification Search
CPC ........... G06Q 30/0269; G06Q 2220/00; G06Q 30/0251; H04L 2209/38
See application file for complete search history.

(56) References Cited

U.S. PATENT DOCUMENTS

| | | |
|---|---|---|
| 9,094,362 B2 | 7/2015 | Lee et al. |
| 9,438,553 B2 | 9/2016 | Lee et al. |
| 9,549,024 B2 * | 1/2017 | Leekley .............. H04L 67/1063 |
| 9,729,497 B2 | 8/2017 | Lee et al. |
| 10,291,627 B2 | 5/2019 | Gleichauf |
| 10,318,979 B2 | 6/2019 | Frank et al. |
| 2007/0233544 A1 | 10/2007 | Frank et al. |
| 2012/0284090 A1 | 11/2012 | Marins et al. |
| 2016/0012424 A1 | 1/2016 | Simon et al. |
| 2016/0117709 A1 | 4/2016 | Postrel |
| 2016/0179482 A1 | 6/2016 | Kramer |
| 2017/0005804 A1 | 1/2017 | Zinder |
| 2017/0041280 A1 | 2/2017 | Savenok et al. |
| 2017/0103472 A1 * | 4/2017 | Shah ......................... H04L 9/32 |
| 2017/0236104 A1 * | 8/2017 | Biton ................... G06Q 20/389 705/64 |
| 2017/0243193 A1 | 8/2017 | Manian |
| 2017/0352012 A1 | 12/2017 | Hearn et al. |
| 2017/0358041 A1 | 12/2017 | Forbes, Jr. et al. |
| 2017/0364825 A1 * | 12/2017 | Tiell ................... G06Q 10/0635 |
| 2018/0005186 A1 | 1/2018 | Hunn |
| 2018/0181979 A1 | 6/2018 | Frank et al. |
| 2018/0225693 A1 | 8/2018 | Postrel |
| 2019/0019208 A1 | 1/2019 | Postrel |
| 2019/0043138 A1 | 2/2019 | Blake et al. |
| 2019/0073666 A1 | 3/2019 | Ortiz et al. |
| 2019/0251591 A1 | 8/2019 | Frank et al. |
| 2020/0074461 A1 | 3/2020 | DeRose-Grund |
| 2020/0134616 A1 | 4/2020 | Rafalko |

* cited by examiner

BLOCKCHAIN-ENABLED CRYPTO ASSET COMPLIANCE SYSTEM FOR TRACKING ASSET ALLOCATION

PRIOR HISTORY

This application is a divisional patent application of pending U.S. patent application Ser. No. 16/134,075 filed in the United States Patent and Trademark Office on 18 Sep. 2018.

BACKGROUND OF THE INVENTION

Field of the Invention

The present invention generally relates to virtual or crypto asset technologies, and more particularly to certain blockchain-enabled crypto asset systems and associated methodology for allowing users to control how advertisers access their personal data; allowing users to be compensated with crypto assets in exchange for social amplification; and tracking crypto asset allocation.

Brief Description of the Prior Art

U.S. Pat. No. 9,549,024 ('024 Patent), issued to Leekley et al., discloses a Routing and Synchronization System, Method, and Manager. The '024 Patent basically describes a system operable with in a peer-to-peer (P2P) content delivery network that delivers select data files to an end user. The content delivery network provides a client, a P2P gateway server, and a Resource Name Server (RNS) within a computer-populated network. The RNS caches data resource locations within the computer-populated network and resolves resource requests with optimal data resource locations within the computer-populated network.

The gateway server requests and receives optimal data resource locations via the RNS; requests and receives data files from the computer-populated network via the optimal data resource locations; and processing received data files for data file delivery to the client. The network thus enables an origin-agnostic data delivery method for optimally delivering select data files to an end user. A data-routing governance or management utility governs/manages the content delivery network and associated methodology for providing industry rights management, compliance monitoring, and/or compliance reporting of data file transmissions.

U.S. Pat. No. 9,729,497 ('497 Patent), issued to Lee et al., discloses a System and Method for Implementing a Subscription-Based Social Media Platform. The '497 Patent describes certain systems and methods for implementing a subscription-based social media or fan club platform wherein a content creator generates live content on a mobile device and sends requests to a server for initializing a live stream from the mobile device. The server sends requests to encoding service providers. The encoded live content is send to a content storage server. Subscribers of the social media or fan club platform can access the live content on their mobile devices from the content storage server. Variants of the '497 Patent are further specified in U.S. Pat. Nos. 8,667,075; 8,769,031; 9,094,362; and 9,438,553.

United States Patent Application Publication No. 2017/0041280 ('280 Publication), authored by Savenok et al., discloses a Smart Routing Synchronization System and associated Methods for Socializing a Synthetic Rebroadcast and Group Stream. The smart routing synchronization system(s) of the '280 Publication socialize a synthetic rebroadcast or group stream for enabling members of a user group to (re)broadcast select content to other members of the user group and collaboratively curate content delivery. The systems are based on a content-identification process and further a process for (re)broadcasting content.

These processes are cooperable among a group of member clients each of which are in communication with at least two content sources. The synchronization process identifies select content and directs delivery of the content from an optimal resource for each member client via a smart routing protocol. The (re)broadcast process prompts delivery of the select content to members of the user group from a content origination member of the group, and group members are thereby able to simultaneously access the content for the purpose of providing a content-based platform for social interaction. As in the '024 Patent, the '280 Publication further describes a data-routing governance or management utility that governs/manages the content delivery network and associated methodology for providing industry rights management, compliance monitoring, and/or compliance reporting of data file transmissions.

A blockchain may be defined as a growing list of cryptographically linked records called blocks. Each block contains a hash of the previous block, a timestamp, and transaction. A blockchain is said to be resistant to modification of the transaction data and basically provides a transaction ledger that records transactions between two parties efficiently and in a verifiable and permanent way. For use as a transaction ledger, a blockchain is typically managed by a P2P network collectively adhering to a protocol for inter-node communication and validating new blocks.

Given the industry rights management necessity of the systems taught by the prior art set forth hereinabove, the prior art perceives a need for certain blockchain-enabled crypto asset systems and associated methodology for allowing users to control how advertisers access their personal data; allowing users to be compensated with crypto assets in exchange for social amplification; and tracking coin allocation n a two party agreement with a public portion, with a song list generation algorithm used to control the expansion of the coin supply.

Virtual currencies and especially cryptocurrencies such as bitcoin, ethereum (ether), litecoin, etc. have been increasing in popularity in recent years. Holders of bitcoin and other cryptocurrencies are not tied to any government, are decentralized, and allow direct transactions, while still maintaining the trust and stability of fiat currencies. Bitcoin in particular appears to be more than a passing fad and with billions in total value in distribution, bitcoin stores significant economic potential. Despite the popularity of cryptocurrencies to date, all cryptocurrencies face the same drawback in that they are not widely accepted.

A smart contract is a computer protocol intended to digitally facilitate, verify, or enforce the negotiation or performance of a contract. Smart contracts allow the performance of credible transactions without third parties. These transactions are trackable and irreversible. Proponents of smart contracts claim that many kinds of contractual clauses may be made partially or fully self-executing, self-enforcing, or both. The aim of smart contracts is to provide security that is superior to traditional contract law and to reduce other transaction costs associated with contracting. Various cryptocurrencies or crypto asset-based systems have implemented types of smart contracts in an attempt to address the shortcomings of cryptocurrency or crypto asset transactions. The present invention attempts to build upon the state of the art embraced by these concepts as summarized in more detail hereinafter.

SUMMARY OF THE INVENTION

The author of these specifications provides a crypto asset or "token" tailored specifically for the music and entertainment industry that applies blockchain technology innovations as a primary means for more properly executing the technologies set forth in the prior art enumerated hereinabove in connection with compliance and payment methods, particularly those set forth in U.S. patent application Ser. No. 14/099,348 ('348 Application) and Ser. No. 15/305,977 ('977 Application) upon which these specifications attempt to build. The data-routing governance or management utilities of the '348 and '977 Applications that operate to govern/manage the content delivery networks are critical to properly provide for industry rights management, compliance monitoring, and/or compliance reporting of data file transmissions.

The present specifications provide that critical compliance. Payments made via blockchain tracking, and the distribution of any revenues derived from cost savings provided to terrestrial, satellite or digital radio broadcasters back to music rights holders and other related groups are provided. These rights holders typically like to incentivize consumers, and by using the crypto assets or tokens created by the present invention, a reward for listening/consuming may be provided. Further, payments for industry services to the rights holder are contemplated to include, but not be limited to any Performance Rights Organizations (PROs), Record Labels, Publishing Companies/Administrators, Managers, Agents or any fractional rights holders or owners who would hold claim against any such revenues.

The same concepts can be applied to revenues resulting from brands looking for ways to reach consumers of entertainment media via the environment at least provided by the '348 and '977 Applications, including venues from advertisement placements within said environment, and programmatic placement of advertising tailored to the individual consumer within said environment regardless of the specific entertainment content being digested where the advertising or marketing is targeting the individual consumer, and not those watching or listening to specific entertainment content.

The present invention further envisions fostering more direct incentives for cooperation between entertainment providers and their fans both individually as well as in a group (e.g. crowd-based milestones as described in more detail in at least the '977 Application), as well as any brands wishing to reach these individual fans or groups of fans by tracking and tying rewards or payments for fans/consumer consumption of an artist or entertainment provider's content where fans or a group of fans participate with the artist or entertainment provider's revenues from both the content itself as well as third party brands or advertiser incentives.

In other words, individual fans or consumers may be rewarded for consuming the entertainment and advertising/marketing content provided by the environment supported by the by the '348 and '977 Applications, as well as the environments supported by U.S. Pat. Nos. 8,667,075; 8,769,031; 9,094,362; 9,729,4979,438,553; and 9,729,497. Similarly, a group of fans with crowd-based milestones for consuming the entertainment content within said environment may be rewarded for consuming the entertainment content. Further, brand-based rewards and incentives may be paid out to either individual fans/consumers of entertainment content or a group of fans with crowd-based milestones, who may also be offered incentives for purchasing decisions including, but not limited to time-based purchasing decisions according to the present invention.

Rewards for the amplification of the activities within the foregoing environment(s) may be further provided to followers or consumers of posted or shared content according to the present invention. The Rewards/Tokens provided by the present invention may provide exclusive access rights rather than financial reward or participation. Such access rights may be earned via these environments or the amplification to others within these environments may include such things as a first right to buy tickets to an event or exclusive reserved VIP seating access or a "meet and greet" the artist either physically or digitally where these environments exist to the content of that artist.

These specifications further contemplated the use of a new type of fan reward card that is tethered to an open set of rewards and capable of tracking purchasing behavior of both individual fans of an artist or entertainment entity as well as groups of fans at moment of purchase in order to either accumulate rewards based upon environmental activity of environments supported by U.S. Pat. Nos. 8,667,075; 8,769,031; 9,094,362; 9,729,4979,438,553; and 9,729,497; or use reward points for the purchasing of goods and services based upon environmental activity of said environment(s).

This new type of fan reward card may be tethered to an existing consumer debit card or bank account and provides a mechanism for the real time reconciliation of time sensitive rewards by intercepting the authorization request from the point of sale (POS) of the participating brand/provider of goods and services wishing to incentivize a given group of fans or the acquiring bank partner of that brand/provider of goods and services. Reconciliation via such a secondary reward reconciliation process and gateway can match an advertised incentive with purchasing behavior and grant rewards based upon both individual as well as group purchasing activity. Reconciliation via such a secondary reward reconciliation process and gateway can also match an advertised incentive with purchasing behavior and pay using previously granted rewards The present invention further contemplates the provision of a crypto ghost coin or token for shielding the identity of the person being rewarded for the participation in all activities listed above so that fans/consumers of content can remain anonymous should they wish both to the entertainment provider or property as well as to the advertising brands or providers of goods and services according to the foregoing, while at the same time being more precisely targeted for their personal demographic, geographic, and consumption behavior. The objective of this ghost method of programmatic rewards is to maintain the efficiency and efficacy of personalization and product fit with an individual consumer of entertainment without that individual compromising their privacy and identity.

An example of the synthetic social broadcast amplification according to the present invention, the reader may refer to Vertigo brand application providing Song Story Contests and User Generated Content (UGC) left behind on the Feed section of the application. When a user creates content (UGC) in the form of videos, photos, etc. and appends it on any segment of a song, other users or his or her friends or followers want to payback that content, no matter if it is still in time of contest or from the feed section of the application, content playback starts with the song segment attached to that and thus compliance reporting becomes critical within this social environment.

The appended music or media file not only makes the UCG such as videos, or photos, etc. more entertaining, but also creates value for rights owners such as artists, writers, labels, etc. by "spinning" the song from premium media content providers such as Spotify, AppleMusic etc. A most important component for music or media content providers such as Spotify, AppleMusic etc. is determining the amount of payment compensation to rights owners via the number of "spins".

Even a small influencer or individual consumer is thus able to significantly increase the number of times a particular song or similar other media plays back or "spins" by inviting his or her followers to see the UGC, or by creating interesting and entertaining UGC attractive to other social media users or by other means. The contest of the Vertigo branded application itself is a significant "gamification" of the synthetic social broadcast amplification effect which creates a condition for viral adoption.

To achieve at least the foregoing objectives, the present invention basically provides certain blockchain-enabled crypto asset systems operable within a computer network environment for allowing (a) a user to control how advertisers access the user's personal data; (b) allowing crypto asset compensation in exchange for social amplification; and (c) tracking asset allocation. Each blockchain-enabled crypto asset system according to the present invention may be said to essentially comprise a remote computer-based service system within the computer network environment, at least one client device for enabling the user to interact with a user blockchain, and a non-transitory computer-implementable application implementable via the at least one client device and the remote computer-based service system.

The remote computer-based service system of a first blockchain-enabled crypto asset system is operable within the computer network environment for connecting 3rd party service/content providers to the user blockchain; validating 3rd party input data to the user blockchain; optimizing consumption data references; and enabling advertisement-targeting services to interact with the user blockchain. The computer-implementable application enables the user to initiate input to the user blockchain via the at least one client device; input personal demographic data and data release rules to the user blockchain; and set data retention rules.

The user blockchain of the first blockchain-enabled crypto asset system provides a mechanism for storing and releasing user data giving the user control of the user's personal data and a mechanism to release the user's personal data for economic consideration. The user blockchain operates to hold a transaction ledger for tracking transactions between the advertisement-targeting services and the user blockchain and a proof of transaction being usable by the user to redeem rewards offered by the advertisement-targeting services in exchange for personal data.

The remote computer-based service system may be made operable to connect 3rd party service/content providers to the user blockchain by mapping IP addresses used by the user as reported by the at least one client device for blockchain identification. The remote computer-based service system may provide the only blockchain address permitted to write validated consumption data to the user blockchain by taking the IP address provided by 3rd party service/content providers, and using a reference database to map IP addresses for blockchain identification.

The remote computer-based service system is operable to optimize consumption data references by either creating a hash table with unique hashes for reported consumption, and only writing hashes to the user blockchain, or creating categories for consumption, and writing category identifications to the user blockchain. The remote computer-based service system thus enables advertisement-targeting services to interact with the user blockchain by providing mapping between at least one client device IP address and blockchain identification thereby enabling the advertisement-targeting services to interact with the user blockchain to receive personal user information provided a preferred targeted advertising campaign meets a set of rules within the user blockchain.

The user blockchain releases the personal data requested by the advertisement-targeting services if the preferred targeted advertising campaign meets the set of rules. The user blockchain may respond with an alternative targeted advertising request to the advertising-targeting service if the preferred targeted advertising campaign does not meet the set of rules. The data retention rules set by the user determine what personal consumption data will be retained by the user blockchain and for what duration, which personal consumption data may be updated by select verified 3rd party service/content providers.

A blockchain-enabled crypto asset social amplification system according to the present invention is operable within a computer network environment for allowing crypto asset compensation in exchange for social amplification and comprises a remote computer-based service system within the computer network environment, a least one at least one client device for enabling the user to interact with the user blockchain and the remote computer-based service system and a non-transitory computer-implementable application implementable via the at least one client device and the remote computer-based service system for enabling the user to initiate input to the user blockchain via the at least one client device; and input personal demographic data.

The remote computer-based service system of the blockchain-enabled crypto asset social amplification system governs user content amplification attribution data input to a user blockchain, which user content amplification attribution data preferably comprises a listing of select content shared by the user, campaign identifications associated with the select content, and a type of consumer interaction. The at least one client device generates an influencer amplification identification linked to the user blockchain via a request to the remote computer-based service system.

The user blockchain blockchain-enabled crypto asset social amplification system provides a mechanism for storing and releasing user data giving the user control of the user's personal data, and a mechanism to release the user's personal data for economic consideration. The user blockchain operating to hold a transaction ledger for tracking blockchain transactions based on the user content amplification attribution data and being usable by the user to redeem rewards offered by 3rd party service/content providers in exchange for personal data.

The blockchain-enabled crypto asset social amplification system may preferably center on the use of user demographic data. The user demographic data is usable to encourage users of a specific demographic to share more by having the 3rd party service/content providers the ability to specify payout rules for amplification payouts to the users of a specific demographic. The user blockchain stores a copy of the payout rules for supporting the amplification payouts.

An amplification campaign blockchain is preferably released in the form of a smart contract with qualified shares being reported to an amplification campaign blockchain. The amplification campaign blockchain registers valid amplification event payouts based on a set of rules set at the initialization of the smart contract. The smart contract may preferably comprise a reference to the select content for amplification, the valid amplification event payouts being registered by linking an influencer amplification identification with a blockchain identification via the remote computer-based service system.

The amplification campaign blockchain duplicates transactions by sending a validated transaction registration request to the user blockchain, and the user blockchain determining capital distribution based on contract capital allocation determined by the set of rules set by the user. The valid amplification event payouts are claimed by registering a payout transaction in the transaction ledger indicating capital distributed to the user in exchange for earned amplification credits/tokens registered in the transaction ledger.

The remote computer-based service system retains the set of rules, the set of rules set by the user are duplicated to the user blockchain, the set of rules being registered by the 3rd party service/content providers via a registration request to the remote computer-based service system. The registration request registers the campaign identifications, amplified content, and the set of rules, and the remote computer-based service system registers valid amplification event payouts by using the user identification for blockchain mapping. The remote computer-based service system calculates the valid amplification event payouts based on user demographic data retrieved from the user blockchain.

A blockchain-enabled crypto asset compliance system operable within a computer network environment tracks asset allocation. The remote computer-based service system provides and maintains a cross provider reference database for mapping media provider content to media content hashes within a media content pool preferably via either a metadata mapping mechanism or a media content finger printing mechanism. Client devices are used by users for creating media content playlists as a basis for media content order hash generation. The client devices pull media content hashes from the media content pool, and use the media content playlists and the media content hashes stored in the cross provider reference database as inputs for algorithm generation. The clients generate an ordered media content list hash that is submitted to the user blockchain.

The user blockchain provides both a mechanism for storing and releasing user data, and a mechanism to release the user's personal data for economic consideration, and operates to hold a transaction ledger for tracking blockchain transactions based on media content consumption and is being usable by the user to redeem rewards offered by $3^{rd}$ party service/content providers.

The ordered media content list hash matches a hidden list hash for prompting both new token generation, and supplemental ordered song list hash generation. The user blockchain is initiated when contract initiation rules are met, original asset allocations being assigned on contract initiation by requests from a primary initiating partner and a secondary initiating partner via identical contract initiation allocations. The user blockchain preferably generates new tokens via an algorithmic mint process comprising the step of generating the hidden list hash from a list of the media content hashes.

The algorithmic mint process may preferably operate based on an ever-increasing number of media content files associated with every hash matched against a client hash submitted by the client devices. Hidden hash complexity is driven by first and second factors, the first factor being the number of media content files in the hidden ordered media content list hash, and the second factor being the number of possible media content files available to fit into each position in the hidden ordered media content list hash, each position being randomly filled from the media content hash pool. When media content hashes are added to the media content pool by the secondary initiating partner, the media content hashes are added to the cross provider reference database, which cross provider reference database maps 3rd party service/content provider data to the media content hashes.

BRIEF DESCRIPTION OF THE DRAWINGS

Other features of the invention will become more evident from a consideration of the following brief descriptions of patent drawings.

DETAILED DESCRIPTION OF THE PREFERRED EMBODIMENTS AND METHODOLOGY

Referring now to the drawings with more specificity, the preferred systems and associated methodologies according to the present invention primarily concern computer-based blockchain-enabled crypto asset type systems operable within a computer network environment as exemplified by the Internet or the world wide web for allowing a user to control how advertisers may access a user's personal data; for compensating a user with crypto assets or currency in exchange for social amplification via social applications with a remote service layer; and made optionally made operable in concert with a smart contracts for tracking asset or coin allocation in a two party agreement with a public portion, and with a song list generation algorithm used to control the expansion of the crypto asset or coin supply.

Figure 1:
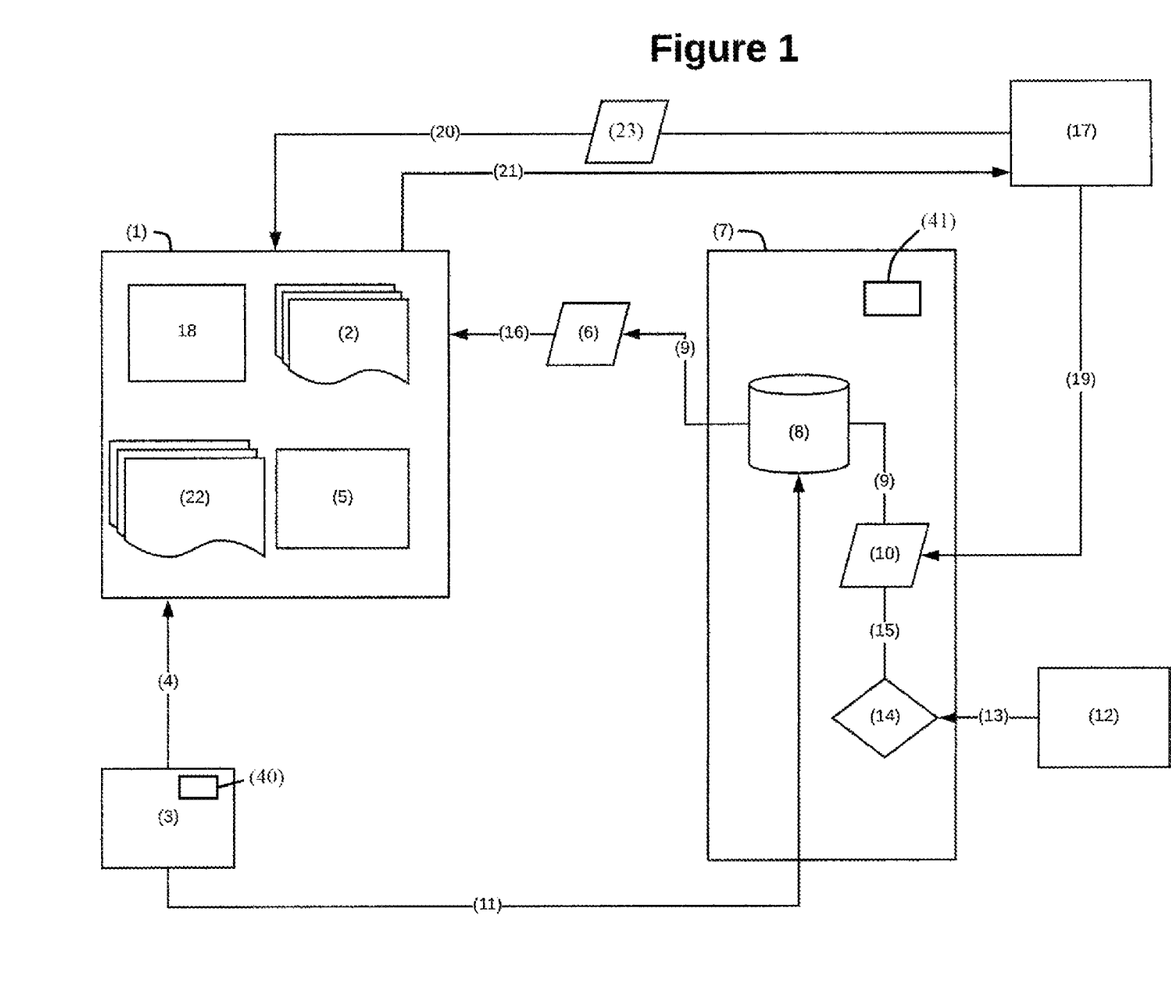
FIG. 1 is a flowchart diagram of a first system according to the present invention depicting a user blockchain in communication with a remove, computer-based service system and at least one client device.

Referencing FIG. 1, the reader will there consider a blockchain-enabled system for allowing a user to control how advertisers access their personal data, with a remote interaction layer that operates to mimic current advertising agency expectations. A blockchain-based or blockchain-enabled smart contract is generally depicted and referenced at 1. While these specifications incorporate language associated with or exemplified by ethereum smart contracts, it is contemplated that the systems according to the present invention could be built on any form of blockchain-enabled system.

The system depicted in FIG. 1 preferably comprises a smart contract (1) ethereum, vernacular for an extendable and customizable blockchain dataset. The blockchain data set or smart contract (1) acts as a mechanism for storing and releasing user data, giving users complete control of their own personal data, and providing a mechanism to release the data for economic consideration. The blockchain data set or smart contract (1) comprises or holds a transaction ledger (22), which transaction ledger (22) tracks transactions between advertising services (17) and the blockchain (1), providing a proof of transaction and cost, which would be used by the user to redeem monetary rewards offered by the advertising services (17) in exchange for personal data associated with the user, including user personal consumption data (2) and user demographic data (18).

A client device (3) exemplified by a tablet computer, desktop computer, smart phone or similar other computer type client device (3) is outfitted with a client-side mobile, desktop or browser application (40) (i.e. a non-transitory computer-implementable software application) enabling users to interact as at (4) with their smart contracts/block chains (1) in the following manners. The user may initiate (4) the smart contract or blockchain (1) by signing up via a client device (3) via the software-based operating application (40) thereby giving the user the sole right to write personal demographic data (18) and data release rules (5) to the blockchain or smart contract (1).

The client side operating application (40) enables the user to set the data retention rules (5) determining what user personal consumption data (2) will be retained by or within the blockchain (1), and for what duration. The user personal consumption data (2) comprises personal consumption data typified by purchase data, search data, and media content consumption such as videos watched, and music played, etc.). Further, the application (40) allows the user to input user demographic data (18) which may include date of birth, zip code, gender, and other pertinent demographic data. The personal consumption data (2) is preferably updated as at (13) by a verified 3rd party service or content provider or merchant (12).

The user personal consumption data (2) and user demographic data (18) may thus be made available to $3^{rd}$ party service or content providers through whose services or content provisions, the user may run a network or web search or utilize a search engine typified by the Google search engine; purchase a product through an e-commerce platform typified by the Amazon Marketplace; watch a video via a video-sharing website typified by the YouTube video-sharing website; or listen to music via a music streaming service provider typified by the Spotify music streaming service.

A remote, computer-based, blockchain interaction service system (7) according to the present invention operates within the computer network and a server side operating application (41) to perform the following primary functions: (1) connecting $3^{rd}$ party service/content providers (12) to user blockchains (1); (2) validating $3^{rd}$ party data input or "writes" to the user blockchains (1); (3) optimizing consumption data references; and (4) enabling advertising-targeting service (17) to interact with the user blockchains (1). The remote, computer-based, blockchain interaction service system (7) preferably connects 3rd party service/content providers (12) to user blockchains (1) by mapping (9) Internet Protocol or IP addresses (10) used by the user as reported (11) by the client devices (3) for blockchain/smart contract identification (6).

The remote, computer-based, blockchain interaction service system (7) validates as at (15) 3rd party data input or reports (14) to the blockchain/smart contract (1) and comprises the only blockchain address permitted to write (16) validated user personal consumption data (2) to a user blockchain/smart contract (1), by taking the IP address (10) provided by 3rd part content providers via reports (14), and uses a reference database (8) to map (9) IP addresses (10) for blockchain/smart contract identification (6). The remote, computer-based, blockchain interaction service system (7) preferably optimizes consumption data references by either (a) creating a hash table with unique hashes for reported consumption, writing hashes to user blockchains/smart contracts (1), or (b) creating categories for consumption, and writing category identifications to user blockchains/smart contracts (1).

The remote, computer-based, blockchain interaction service system (7) would also enable advertising-targeting service (17) to interact with the user blockchain/smart contract (1) by providing mapping (19) between the device IP address (10) and blockchain identification (6), enabling the advertising-targeting service (17) to interact with the user blockchain/smart contract (1) to receive user personal consumption data (2) and user demographic data (18). If the offer (23) from the advertising-targeting service (17) meets the user's set price and rules for date release (5), the user blockchain/smart contract (1) releases the user personal consumption data (2) and user personal demographic data (18) as requested (20) by the marketing/advertising-targeting service (17). If the offer (23) from the advertising-targeting service (17) does not meet the user's set price and rules for date release (5), the user blockchain/smart contract (1) preferably responds as at (21), which response can be used by the marketing/advertising-targeting service (17) to craft an appropriate supplemental offer (23).

Social Amplification System

Figure 2:
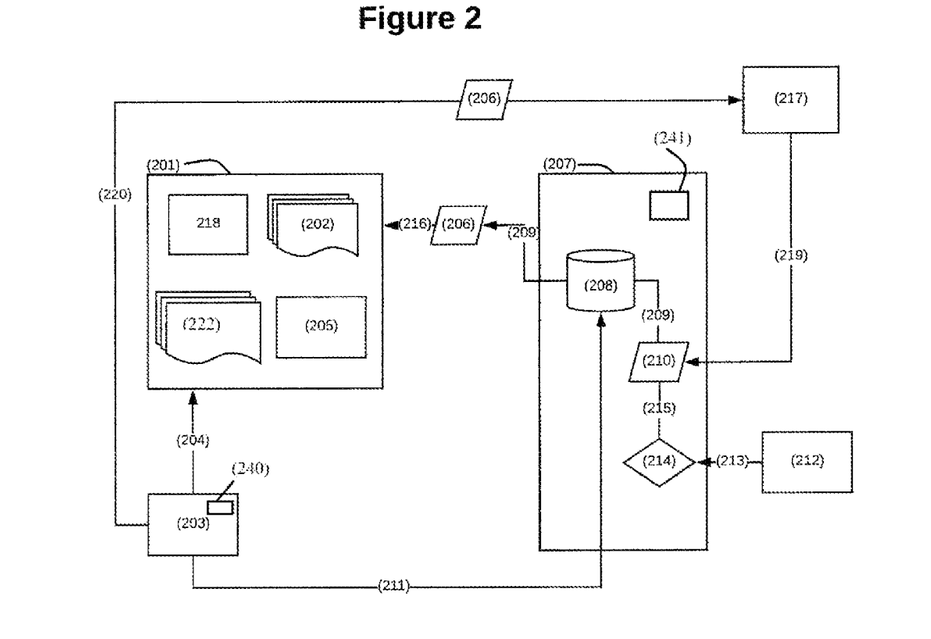
FIG. 2 is a flowchart diagram of a second system according to the present invention depicting a user blockchain in communication with a remove, computer-based service system and at least one client device.
Figure 3:
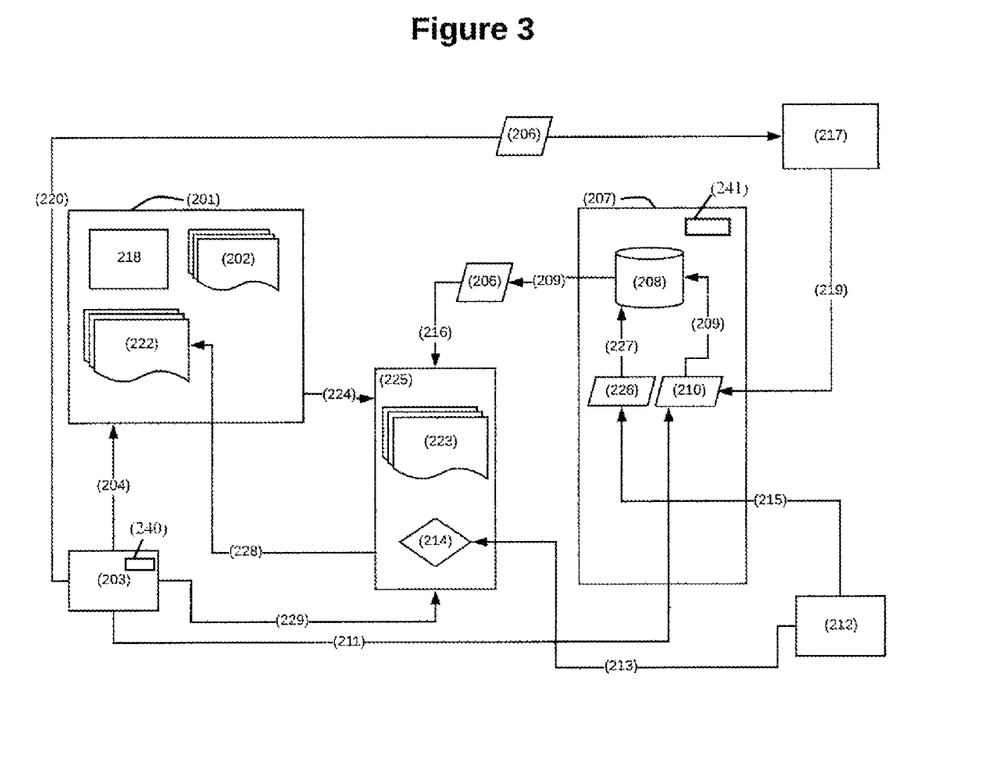
FIG. 3 is a flowchart diagram of a third system according to the present invention depicting a user blockchain in communication with a remove, computer-based service system and at least one client device.

A social amplification system according to the present invention is generally depicted and referenced in FIGS. 2 and 3. The social amplification system is a blockchain-enabled system that primary functions to allow a user to be compensated with crypto currency or a crypto asset in exchange for social amplification via social applications interacting with a remote service layer. The social amplification system according to the present invention is primarily built around a user blockchain-secured document/database, smart contract as at (201).

The blockchain-secured document/database, smart contract as at (201) is used to store a user's content amplification attribution data (202). The user's content amplification attribution data (202) comprises (a) a listing of social content shared by the user; (b) certain campaign identifications with which the social content is associated; and (c) the type of viewer or consumer interaction taken (e.g. a post view, content playback, or visit to merchant/vendor site). The client device (203) initiates as at (204) the user blockchain-secured document/database, smart contract as at (201) via a client side application (240) and in the process generates an influencer amplification identification that is linked to the user blockchain-secured document/database, smart contract as at (201) after it is created via a request (211) to the remote, computer-based, blockchain interaction service system (207) or remote service having a server side operating application (241).

The user blockchain-secured document/database, smart contract (201) preferably contains within itself four pieces of data, including user or influencer demographic data (218), payout rules (205), the user or influencer content amplification attribution data (202), and the transaction ledger (222). The user or influencer demographic data (218) may preferably be used to encourage users or influencers of or from a specific demographic to share more content by having the 3rd party service/content providers (212) the ability to specify rules for amplification payout as at (214), which rules for amplification payout (214) favor specific demographics by increasing payouts to users or influencers of or from a specific demographic. The user blockchain-secured document/database, smart contract (201) stores a copy of the payout rules as at (205).

An alternative social amplification system according to the present invention is generally depicted and referenced in FIG. 3. The alternative social amplification system according to the present invention releases as at (213) the amplification campaign as an amplification campaign blockchain (225) preferably in the form of a smart contract, with each qualified share reported as at (216) to the amplification campaign blockchain (225), which in turn registers as at (215) payouts for valid amplification events based on rules for amplification payout (214) set at the initialization of the user blockchain-secured document/database, smart contract (201).

The user blockchain-secured document/database, smart contract (201) may be referred to as a campaign contract in that it preferably contains a reference to the content that should be amplified according to the campaign. Payouts are registered by linking as at (209) the user or influencer amplification identification (210) with blockchain identification, which identifications can be one and the same, depending on how a reference to the user blockchain-secured document/database, smart contract (201) is designed). Payouts are registered by way of the remote, computer-based, blockchain interaction service system (207) into the campaign smart contract provided the smart contract contains a reference to the user blockchain-secured document/database, smart contract (201). The reference to the influencer block chain (201) is used to register a transaction into the campaign blockchain ledger (223), and the transaction payout is determined by payout rules (214).

The campaign blockchain (225) duplicates the transaction by sending a validated transaction registration request (228) to the influencer blockchain (201). The influencer blockchain (201) is then used to determine capital distribution (224) based on contract capital allocation determined by the payout rules (214). Payout would be claimed by registering a transaction in the influencer blockchain ledger (222) indicating capital distributed to the user or influencer in exchange for earned amplification credits/tokens registered in the influencer ledger (222). A client device (203) likewise interacts as at (229) with the campaign blockchain (225) to present to the user or influencer the estimated payout per share or amplification type and the content that should be amplified.

The reader will note that the rewards or tokens according to these specifications may not be preferably classified as currency or as securities since the rewards/tokens created by the invention is built comprise more flexibility depending on the class of reward/token owned. At times, the reward/token will function akin to frequent flyer points as derived from listening to the music, consuming other media content, or as derived from consuming advertising/marketing materials, and thus do have the ability to buy goods and services within the music and entertainment industry. The rewards/tokens may, however, be traded on an exchange and represent ownership participation in a song's royalties or similar other royalties deriving from media content. In this last regard, the rewards/tokens according to the present invention may qualify as a commodity or even a security depending on how the reward or token is acquired.

Another alternative social amplification system according to the present invention is generally depicted and referenced in FIG. 2. According to the social amplification system depicted in FIG. 2, the remote, computer-based, blockchain interaction service system (207) holds the payout rules (214), which are then duplicated to the user or influencer blockchain (201). The payout rules (214) are registered by 3rd party service/content distributors (212) via a request (any request sent via the IP protocol) (213) to the remote, computer-based, blockchain interaction service system or remote services (207).

This request (213) registers the campaign identification (226), amplified content, and payout rules (214). The remote service (207) then registers as at (215) a payout (216) for valid amplification events by using the user or influencer identification-to-blockchain mapping as at (209) as stored in the blockchain mapping database (208) in communication with the user or influencer block chain ledger (222), taking into account payout rules (214). Calculation of payout may require the remote services (207) to retrieve from the influencer block chain (201) demographic data (218) to calculate payout.

Crypto Asset to Cash Conversion

Figure 4:
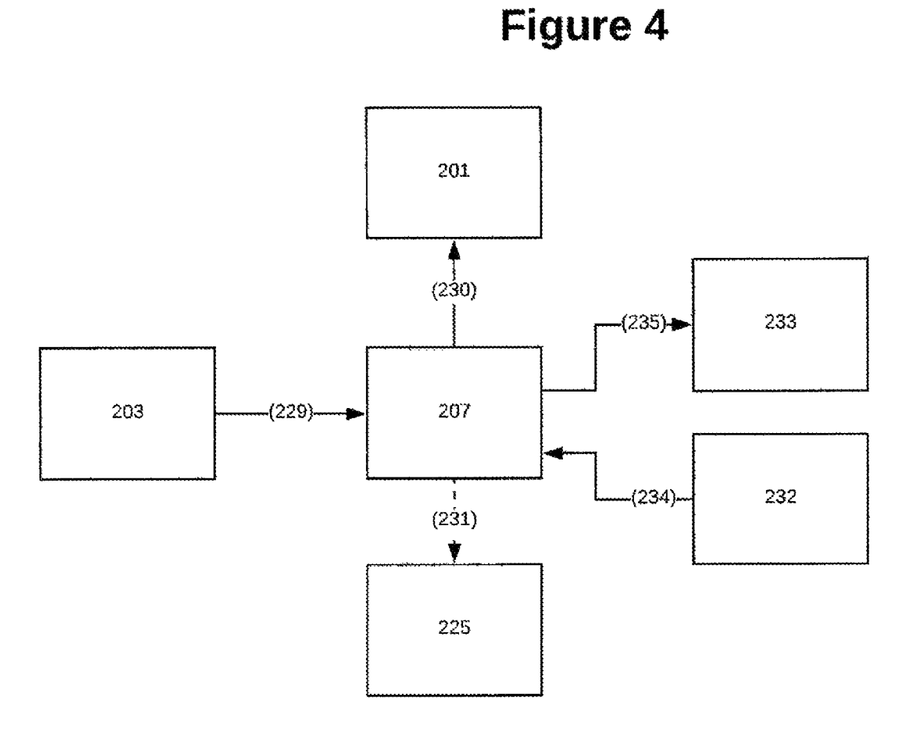
FIG. 4 is a flowchart diagram of a fourth system according to the present invention depicting crypto asset to cash conversion payout arrangements.

Comparatively referencing FIGS. 2 and 3 in conjunction with FIG. 4, the reader will consider the user has the option convert their amplification tokens/credits for cash or other forms of rewards. In the case of a cash conversion, the client device (203) puts in a request as at (229) to the remove service (207) to convert a specified number of tokens, and the remote services (207) retrieves as at (230) the registered tokens from the user or influencer blockchain (201). If the system variant of FIG. 2 is used then the remote service (207) will validate the request from the client device (203). If the system variant of FIG. 3 is used, then the remote service (207) will send a validation request as at (231) to the campaign blockchain (225).

If the request is validated, then a debit (234) to the financial institution (232) of 3rd party service/content providers may be sent for the amount of the payout. Similarly a credit (235) is sent to the user's or influencer's financial institution (233). After credit and debit, the ledgers (222) and (223) of both influencer and campaign blockchains (201) and (225) are updated to reflect the payout. The conversion is determined by the payout rules (214). Capital for the campaign can be debited before conversion to ensure payout. Token conversion is not be limited to cash conversion. Cash conversion is simply an example of what is possible.

Tokens can be converted to rewards, or traded in exchange for other intangibles or tangible goods, services, or securities. The user or influencer blockchain (201) may further preferably comprise a participation ledger permitting multiple parties to participate in a user's or influencer's earned capital. This feature creates the possibility of creating a secondary market in which influencer participation in influencer coins could be bought and sold, and the possibility of an Initial Coin Offering or ICO for the user's or influencer's coin.

The client device (203) enables the user/influencer to easily promote the campaign content by enabling them to post as at (220) directly to their social network of choice (217) from the client interface. The client device (203) may utilize a Uniform Resource Locator or URL-shortening service to obscure the source of the link if the user or influencer does not want to be seen promoting content for payment. The post (220) may include URL's that redirect (e.g. an HTTP request code as at (303)) through the remote service (207), with the campaign id, and influencer id embedded into the URL (206).

The remote services (207) use the campaign identification (226) and influencer identification (210) and a redirect URL to validate the amplification event and register such events (215) with either the campaign blockchain (225) or within the remote service (207) depending on the system variant used. The service would redirect the consuming to the campaign content. The type of user engagement would be implied from the URL destination. If it is registered to a post image, then it is registered as a view. Video consumption may be registered as a playback request, and a URL redirect to a store would be credited as an acquired customer.

Crypto Music/Media Content

Figure 5:
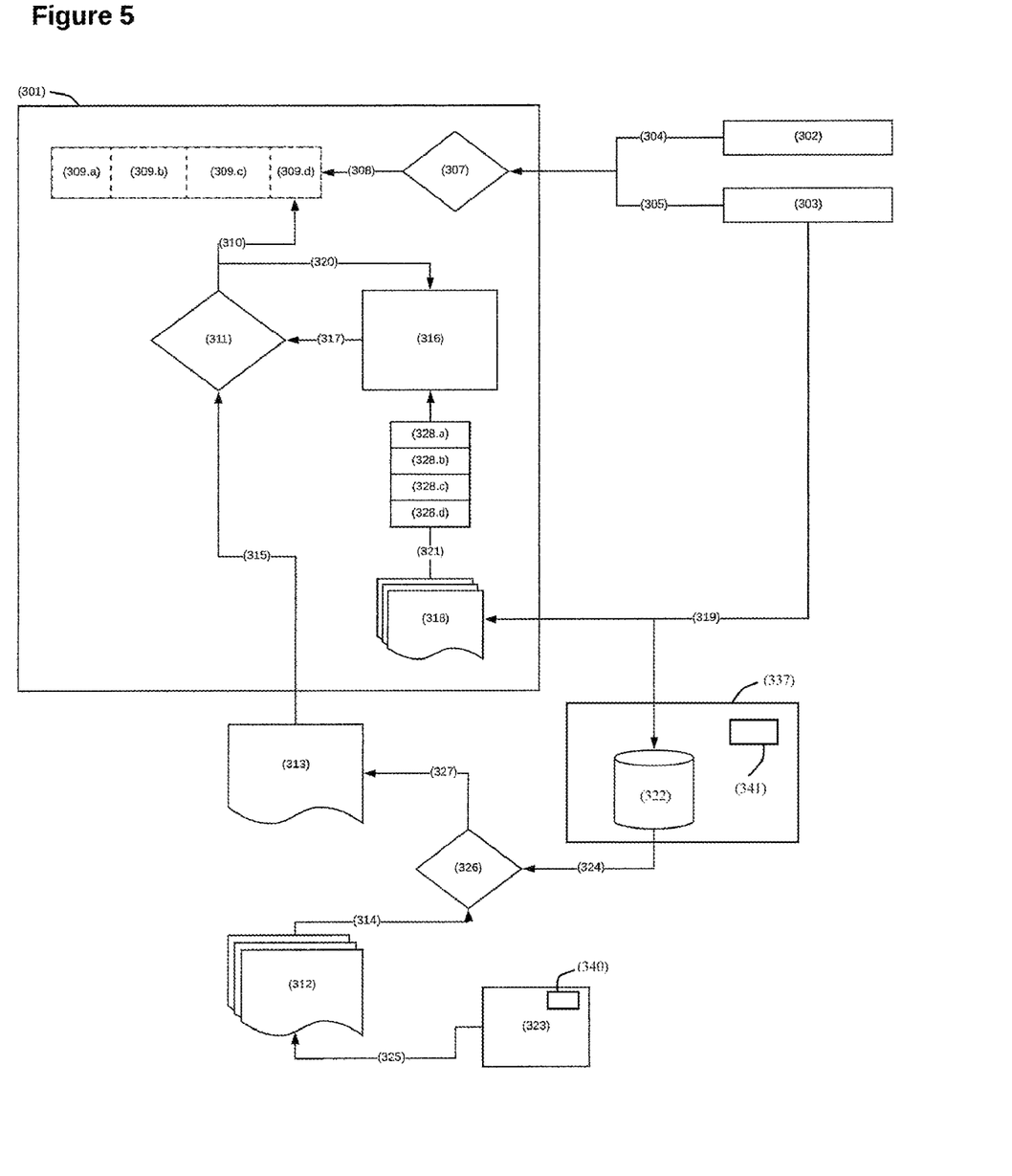
FIG. 5 is a flowchart diagram of a fifth system according to the present invention depicting a user blockchain in communication with a remove, computer-based service system and at least one client device.

Referencing FIG. 5 the reader will there consider the present invention further provides a blockchain-enabled system operating with a smart contract enabled to track coins allocated in a two party agreement with a public portion, with a song list generation algorithm used to control the expansion of the coin supply. The system preferably comprises three primary components, including a blockchain secured/enabled smart contract, at least one client device, and remote service with interactions therebetween being governed by a non-transitory computer-implementable application (340/341).

The smart contract (301) is initiated as at (308) by the user if the rules (307) for initiation are met. On initiation, original coin allocations as at (309.a-309.c) are assigned. A primary partner portion (309.a), a secondary partner portion (309.b), a public portion (309.c), and an algorithmically expanding portion (309.d) may be originally allocated. To initiate the smart contract (301) one possible set of initiation rules (307) are required with a primary initiating partner (302) and a secondary initiating partner (303) submitting requests as at (304/305) to initiate the smart contract (301) with the same original coin allocations (309.a-309.c) for the smart contract (301).

The smart contract (301) preferably enables the generation of new coins with an algorithmic mint process (310). The algorithmic mint process (310) starts when the blockchain/smart contract (301) generates a secret or hidden ordered song (or other media content) list hash as at (316) as generated from a list of song hashes (318). The algorithm uses as at (321) and ever-increasing number of songs with every hash matched as at (317) to a client hash (313) submitted as at (315) by the client device (323) having a client side operating application (340).

The secret or hidden hash complexity is preferably driven by two factors, including a first factor comprising the number of songs in the ordered list as at (328.a-d), and a second factor comprising the number of possible songs from a song hash pool (318) available to fit into each position in the list (328.a-d). Each position is randomly filled from the song hash pool (318). The complexity of the algorithm would in increase in the following manner:

x=number of songs in song hash pool
y=length of ordered song list
x^y=possible search space As more song hashes are added as at (319) to the song hash pool (318) by the secondary initiating partner (303), the search space that clients need to search to generate a new coin increases, and the length of the song list (328.a-d) increases with every newly algorithmically minted (310) coin. As song hashes are added to the song hash pool (318) by the secondary initiating partner (303) they are also added to a database (322), they are preferably mapped to 3rd party provider data. In this regard, the reader is directed to U.S. patent application Ser. No. 14/099,348 and U.S. patent application Ser. No. 15/305,977 upon which applications the present specifications build.

The system may alternatively operate with a single initiating partner, in which case all functions of the partners (302/303) would be executed by a single entity. The system may further operate with multiple secondary partners, each receiving an original coin allocation determined by the primary initiating partner (302), and which allocation is determined by the number of participating secondary partners (303). The smart contract (301) may further be used to pre-sell rights to music (as in PSL rights) or otherwise select assets to a right of access, which right of access is resalable. The original coin allocation may be sold to 3rd parties, while the new algorithmically generated coins would be given out based on the music mining algorithm as loyalty or rewards coins. Algorithmically generated coins may be of a different class than the initial offer (308), representing different levels of loyalty rewards or rights of access, including early access to concerts, VIP lounges, live chat access etc.

The value of the initial coin release (308) and optionally the algorithmically generated coins would be backed by the savings derived from the smart routing systems as described more fully in U.S. patent application Ser. No. 14/099,348 and U.S. patent application Ser. No. 15/305,977, owned by the author of these specifications and upon which the present specifications build. A mobile, desktop or web client device (323) allows the user to create as at (325) playlists (312) which would serve as the basis for song order hash generation (314). The client device pulls as at (324) the song hashes from a smart contract song hash pool (318) from a reference database (322), and uses the playlist structure (312) and the song hashes from the song hash pool (318) stored in the database (322) as inputs (314) to an ordered song list hashing algorithm (326). The client device (323) generates as at (327) an order song list hash (313) that is then submitted as at (315) to the smart contract (301).

If the client device (323) submits an ordered song list hash (313) that matches (317) the Secret ordered song list hash (316), a new coin is generated via the mint process (310), and a new and more complicated ordered song list hash is generated as at (320). A remote service (337) having a server side operating application (341) provides and maintains a cross provider reference database (322), which would map media provider content to the song hashes in the song hash pool (318) using either a metadata mapping or audio finger printing mechanism as described more fully in U.S. patent application Ser. No. 14/099,348 and U.S. patent application Ser. No. 15/305,977, owned by the author of these specifications and upon which the present specifications build.

While the foregoing specifications set forth with finer specificity a number of systemic embodiments, the specifications are believed to basically or essentially certain blockchain-enabled crypto asset systems operable within a computer network environment for allowing (a) a user to control how advertisers access the user's personal data; (b) allowing crypto asset compensation in exchange for social amplification; and (c) tracking asset allocation as earlier prefaced.

Each blockchain-enabled crypto asset system according to the present invention may be said to essentially comprise a remote computer-based service system within the computer network environment, at least one client device for enabling the user to interact with a user blockchain, and a non-transitory computer-implementable application implementable via the at least one client device and the remote computer-based service system.

The remote computer-based service system of a first blockchain-enabled crypto asset system made the central focus of U.S. patent application Ser. No. 16/134,075 and from which this application is a first divisional application is operable within the computer network environment for connecting 3rd party service/content providers to the user blockchain; validating 3rd party input data to the user blockchain; optimizing consumption data references; and enabling advertisement-targeting services to interact with the user blockchain. The computer-implementable application enables the user to initiate input to the user blockchain via the at least one client device; input personal demographic data and data release rules to the user blockchain; and set data retention rules.

The user blockchain of the first blockchain-enabled crypto asset system provides a mechanism for storing and releasing user data giving the user control of the user's personal data and a mechanism to release the user's personal data for economic consideration. The user blockchain operates to hold a transaction ledger for tracking transactions between the advertisement-targeting services and the user blockchain and a proof of transaction being usable by the user to redeem rewards offered by the advertisement-targeting services in exchange for personal data.

The remote computer-based service system may be made operable to connect 3rd party service/content providers to the user blockchain by mapping IP addresses used by the user as reported by the at least one client device for blockchain identification. The remote computer-based service system may provide the only blockchain address permitted to write validated consumption data to the user blockchain by taking the IP address provided by 3rd party service/content providers, and using a reference database to map IP addresses for blockchain identification.

The remote computer-based service system is operable to optimize consumption data references by either creating a hash table with unique hashes for reported consumption, and only writing hashes to the user blockchain, or creating categories for consumption, and writing category identifications to the user blockchain. The remote computer-based service system thus enables advertisement-targeting services to interact with the user blockchain by providing mapping between at least one client device IP address and blockchain identification thereby enabling the advertisement-targeting services to interact with the user blockchain to receive personal user information provided a preferred targeted advertising campaign meets a set of rules within the user blockchain.

The user blockchain releases the personal data requested by the advertisement-targeting services if the preferred targeted advertising campaign meets the set of rules. The user blockchain may respond with an alternative targeted advertising request to the advertising-targeting service if the preferred targeted advertising campaign does not meet the set of rules. The data retention rules set by the user determine what personal consumption data will be retained by the user blockchain and for what duration, which personal consumption data may be updated by select verified 3rd party service/content providers.

A blockchain-enabled crypto asset social amplification system according to the present invention to be made the subject of a second divisional application from U.S. patent application Ser. No. 16/134,075 and the present specifications is operable within a computer network environment for allowing crypto asset compensation in exchange for social amplification and comprises a remote computer-based service system within the computer network environment, a least one at least one client device for enabling the user to interact with the user blockchain and the remote computer-based service system and a non-transitory computer-implementable application implementable via the at least one client device and the remote computer-based service system for enabling the user to initiate input to the user blockchain via the at least one client device; and input personal demographic data.

The remote computer-based service system of the blockchain-enabled crypto asset social amplification system governs user content amplification attribution data input to a user blockchain, which user content amplification attribution data preferably comprises a listing of select content shared by the user, campaign identifications associated with the select content, and a type of consumer interaction. The at least one client device generates an influencer amplification identification linked to the user blockchain via a request to the remote computer-based service system.

The user blockchain blockchain-enabled crypto asset social amplification system provides a mechanism for storing and releasing user data giving the user control of the user's personal data, and a mechanism to release the user's personal data for economic consideration. The user blockchain operating to hold a transaction ledger for tracking blockchain transactions based on the user content amplification attribution data and being usable by the user to redeem rewards offered by 3rd party service/content providers in exchange for personal data.

The blockchain-enabled crypto asset social amplification system may operable around the use of user demographic data. The user demographic data is usable to encourage users of a specific demographic to share more by having the 3rd party service/content providers the ability to specify payout rules for amplification payouts to the users of a specific demographic. The user blockchain stores a copy of the payout rules for supporting the amplification payouts.

An amplification campaign blockchain is preferably released in the form of a smart contract with qualified shares being reported to an amplification campaign blockchain. The amplification campaign blockchain registers valid amplification event payouts based on a set of rules set at the initialization of the smart contract. The smart contract may preferably comprise a reference to the select content for amplification, the valid amplification event payouts being registered by linking an influencer amplification identification with a blockchain identification via the remote computer-based service system.

The amplification campaign blockchain duplicates transactions by sending a validated transaction registration request to the user blockchain, and the user blockchain determining capital distribution based on contract capital allocation determined by the set of rules set by the user. The valid amplification event payouts are claimed by registering a payout transaction in the transaction ledger indicating capital distributed to the user in exchange for earned amplification credits/tokens registered in the transaction ledger.

The remote computer-based service system retains the set of rules, the set of rules set by the user are duplicated to the user blockchain, the set of rules being registered by the 3rd party service/content providers via a registration request to the remote computer-based service system. The registration request registers the campaign identifications, amplified content, and the set of rules, and the remote computer-based service system registers valid amplification event payouts by using the user identification for blockchain mapping. The remote computer-based service system calculates the valid amplification event payouts based on user demographic data retrieved from the user blockchain.

A blockchain-enabled crypto asset compliance system operable within a computer network environment tracks asset allocation as is made the focus of this first divisional application from U.S. patent application Ser. No. 16/134,075. The remote computer-based service system provides and maintains a cross provider reference database for mapping media provider content to media content hashes within a media content pool preferably via either a metadata mapping mechanism or a media content finger printing mechanism. Client devices are used by users for creating media content playlists as a basis for media content order hash generation. The client devices pull media content hashes from the media content pool, and use the media content playlists and the media content hashes stored in the cross provider reference database as inputs for algorithm generation. The clients generate an ordered media content list hash that is submitted to the user blockchain.

The user blockchain provides both a mechanism for storing and releasing user data, and a mechanism to release the user's personal data for economic consideration, and operates to hold a transaction ledger for tracking blockchain transactions based on media content consumption and is being usable by the user to redeem rewards offered by $3^{rd}$ party service/content providers.

The ordered media content list hash matches a hidden list hash for prompting both new token generation, and supplemental ordered song list hash generation. The user blockchain is initiated when contract initiation rules are met, original asset allocations being assigned on contract initiation by requests from a primary initiating partner and a secondary initiating partner via identical contract initiation allocations. The user blockchain preferably generates new tokens via an algorithmic mint process comprising the step of generating the hidden list hash from a list of the media content hashes.

The algorithmic mint process may preferably operate based on an ever-increasing number of media content files associated with every hash matched against a client hash submitted by the client devices. Hidden hash complexity is driven by first and second factors, the first factor being the number of media content files in the hidden ordered media content list hash, and the second factor being the number of possible media content files available to fit into each position in the hidden ordered media content list hash, each position being randomly filled from the media content hash pool. When media content hashes are added to the media content pool by the secondary initiating partner, the media content hashes are added to the cross provider reference database, which cross provider reference database maps 3rd party service/content provider data to the media content hashes.

Accordingly, although the invention has been described by reference to certain preferred systemic embodiments and certain associated methodologies, it is not intended that the novel systemic embodiments and associated methods be limited thereby, but that modifications thereof are intended to be included as falling within the broad scope and spirit of the foregoing disclosures and the appended drawings.

What is claimed is:

1. A blockchain-enabled crypto asset compliance system operable within a computer network environment for tracking asset allocation, the blockchain-enabled crypto asset system comprising:
    a remote computer-based service system within the computer network environment;
    at least one client device for enabling the user to interact with the remote computer-based service system;
    a non-transitory computer-implementable application implementable via the at least one client device and the remote computer-based service system, the remote computer-based service system, the at least one client and the non-transitory computer-implementable application together being operable for creating a user-controlled, blockchain-enabled smart contract;
    the non-transitory computer-implementable application for enabling the user to (a) initiate input to the user-controlled, blockchain-enabled smart contract via the at least one client device; (b) input personal demographic data and set data release rules for the user-controlled, blockchain-enabled smart contract; and (c) set data retention rules for the user-controlled, blockchain-enabled smart contract;
    the remote computer-based service system being operable to provide and maintain a cross-provider reference database, the cross-provider reference database for mapping media provider content to media content hashes within a media content hash pool;
    the at least one client device for creating media content playlists, the media content playlists providing a basis for media content order hash generation, the at least one client device pulling media content hashes from the media content hash pool, and using the media content playlists and the media content hashes stored in the cross-provider reference database as inputs for algorithm generation, the at least one client generating an ordered media content list hash, the ordered media content list hash matching a hidden list hash for prompting (a) new asset generation via an algorithmic mint process and (b) supplemental ordered song list hash generation, the ordered media content list hash being submitted to the user-controlled, blockchain-enabled smart contract;
    the user-controlled, blockchain-enabled smart contract operating to hold a transaction ledger, the transaction ledger for tracking transactions between third party service/content providers and the user-controlled, blockchain-enabled smart contract, the user-controlled, blockchain-enabled smart contract providing (a) a mechanism for storing and releasing user data for economic consideration and (b) enabling the user to redeem rewards offered by third party service/content providers.

2. The blockchain-enabled crypto asset compliance system of claim 1 wherein the user-controlled, blockchain-enabled smart contract is initiated when contract initiation rules are met, original asset allocations being assigned on contract initiation by requests from a primary initiating partner and a secondary initiating partner via identical contract initiation allocations.

3. The blockchain-enabled crypto asset compliance system of claim 2 wherein the algorithmic mint process comprises the step of generating the hidden list hash from a list of media content hashes.

4. The blockchain-enabled crypto asset compliance system of claim 3 wherein the algorithmic mint process uses an ever-increasing number of media content files associated with every hash matched against a client hash submitted by the at least one client device.

5. The blockchain-enabled crypto asset compliance system of claim 4 wherein hidden hash complexity is driven by first and second factors, the first factor being the number of media content files in the hidden list hash, the second factor being the number of possible media content files available to fit into each position in the hidden list hash, each position being randomly filled from the media content hash pool.

6. The blockchain-enabled crypto asset compliance system of claim 2 wherein the secondary initiating partner adds media content hashes to the media content hash pool by way of the cross-provider reference database, the cross-provider reference database mapping third party service/content provider data to the media content hashes.

7. The blockchain-enabled crypto asset compliance system of claim 1 wherein select assets provide a right of access, the right of access being resalable.

8. A blockchain-enabled crypto asset compliance system operable within a computer network environment for tracking asset allocation, the blockchain-enabled crypto asset system comprising:
  a remote computer-based service system within the computer network environment;
  at least one client device for enabling the user to interact with the remote computer-based service system;
  a non-transitory computer-implementable application implementable via the at least one client device and the remote computer-based service system, the remote computer-based service system, the at least one client and the non-transitory computer-implementable application together being operable for creating a user-controlled, blockchain-enabled smart contract;
  the non-transitory computer-implementable application enabling the user to (a) initiate input to the user-controlled, blockchain-enabled smart contract via the at least one client device; (b) input personal demographic data and set data release rules for the user-controlled, blockchain-enabled smart contract; and (c) set data retention rules for the user-controlled, blockchain-enabled smart contract;
  the remote computer-based service system being operable to provide and maintain a cross-provider reference database, the cross-provider reference database for mapping media provider content to media content hashes within a media content hash pool;
  the at least one client device for creating media content playlists, the media content playlists providing a basis for media content order hash generation, the at least one client device pulling media content hashes from the media content hash pool and using the media content playlists and the media content hashes stored in the cross-provider reference database as inputs for algorithm generation;
  the at least one client generating an ordered media content list hash, the ordered media content list hash being submitted to the user-controlled, blockchain-enabled smart contract for prompting new asset generation and supplemental ordered song list hash generation;
  a secondary initiating partner adding media content hashes to the media content hash pool by way of the cross-provider reference database, the cross-provider reference database mapping third party service/content provider data to the media content hashes;
  the user-controlled, blockchain-enabled smart contract operating to hold a transaction ledger, the transaction ledger for tracking transactions between third party service/content providers and the user-controlled, blockchain-enabled smart contract, the user-controlled, blockchain-enabled smart contract providing a mechanism for storing and releasing user data for economic consideration and enabling the user to redeem rewards offered by third party service/content providers.

9. The blockchain-enabled crypto asset compliance system of claim 8 wherein the user-controlled, blockchain-enabled smart contract is initiated when contract initiation rules are met, original asset allocations being assigned on contract initiation by requests from a primary initiating partner and the secondary initiating partner via identical contract initiation allocations.

10. The blockchain-enabled crypto asset compliance system of claim 9 wherein the user-controlled, blockchain-enabled smart contract generates new assets via an algorithmic mint process, the algorithmic mint process comprising a step of generating a hidden list hash from a list of media content hashes.

11. The blockchain-enabled crypto asset compliance system of claim 10 wherein the algorithmic mint process uses an ever-increasing number of media content files associated with every hash matched against a client hash submitted by the at least one client device.

12. The blockchain-enabled crypto asset compliance system of claim 11 wherein hidden hash complexity is driven by first and second factors, the first factor being the number of media content files in the hidden list hash, the second factor being the number of possible media content files available to fit into each position in the hidden list hash, each position being randomly filled from the media content hash pool.

13. The blockchain-enabled crypto asset compliance system of claim 8 wherein select assets provide a right of access, the right of access being resalable.

14. A blockchain-enabled crypto asset compliance system operable within a computer network environment for tracking asset allocation, the blockchain-enabled crypto asset system comprising:
  a remote computer-based service system within the computer network environment;
  at least one client device for enabling the user to interact with the remote computer-based service system;
  a non-transitory computer-implementable application implementable via the at least one client device and the remote computer-based service system, the remote computer-based service system, the at least one client and the non-transitory computer-implementable application together being operable for creating a user-controlled, blockchain-enabled smart contract;
  the non-transitory computer-implementable application for enabling the user to (a) initiate input to the user-controlled, blockchain-enabled smart contract via the at least one client device; (b) input personal demographic data and set data release rules for the user-controlled, blockchain-enabled smart contract; and (c) set data retention rules for the user-controlled, blockchain-enabled smart contract;
  the user-controlled, blockchain-enabled smart contract being initiated when contract initiation rules are met, original asset allocations being assigned on contract initiation by requests from a primary initiating partner and a secondary initiating partner via identical contract initiation allocations;
  the remote computer-based service system being operable to provide and maintain a cross-provider reference database, the cross-provider reference database for mapping media provider content to media content hashes within a media content hash pool;
  the at least one client device for creating media content playlists, the media content playlists providing a basis for media content order hash generation, the at least one client device pulling media content hashes from the media content hash pool, and using the media content playlists and the media content hashes stored in the cross-provider reference database as inputs for algorithm generation;

the at least one client generating an ordered media content list hash, the ordered media content list hash being submitted to the user-controlled, blockchain-enabled smart contract, the user-controlled, blockchain-enabled smart contract generating new assets via an algorithmic mint process, the algorithmic mint process comprising a step of generating a hidden list hash from a list of media content hashes;

the user-controlled, blockchain-enabled smart contract operating to hold a transaction ledger, the transaction ledger for tracking transactions between third party service/content providers and the user-controlled, blockchain-enabled smart contract, the user-controlled, blockchain-enabled smart contract providing (a) a mechanism for storing and releasing user data for economic consideration and (b) enabling the user to redeem rewards offered by third party service/content providers.

15. The blockchain-enabled crypto asset compliance system of claim 14 wherein the ordered media content list hash matches the hidden list hash for prompting (a) new asset generation, and (b) supplemental ordered song list hash generation.

16. The blockchain-enabled crypto asset compliance system of claim 14 wherein the algorithmic mint process uses an ever-increasing number of media content files associated with every hash matched against a client hash submitted by the at least one client device.

17. The blockchain-enabled crypto asset compliance system of claim 16 wherein hidden hash complexity is driven by first and second factors, the first factor being the number of media content files in the hidden list hash, the second factor being the number of possible media content files available to fit into each position in the hidden list hash, each position being randomly filled from the media content hash pool.

18. The blockchain-enabled crypto asset compliance system of claim 14 wherein media content hashes are added to the media content hash pool by the secondary initiating partner by way of the cross-provider reference database, the cross-provider reference database mapping third party service/content provider data to the media content hashes.

19. The blockchain-enabled crypto asset compliance system of claim 14 wherein select assets provide a right of access, the right of access being resalable.

* * * * *